June 22, 1943.  R. H. BUTTERS  2,322,506
MACHINE FOR AND METHOD OF RELIEVING MILLING CUTTERS
Filed Aug. 22, 1940  2 Sheets-Sheet 2
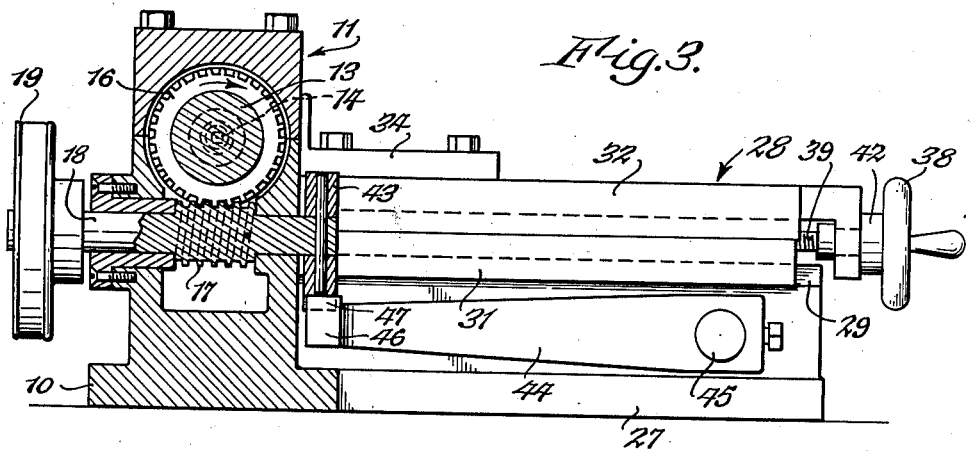
Fig. 3.
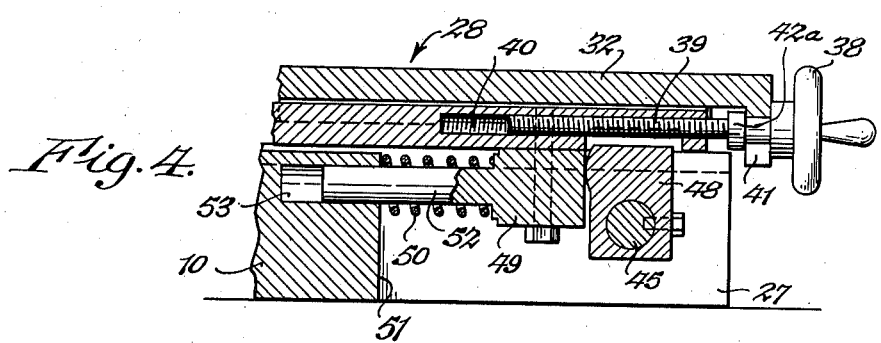
Fig. 4.
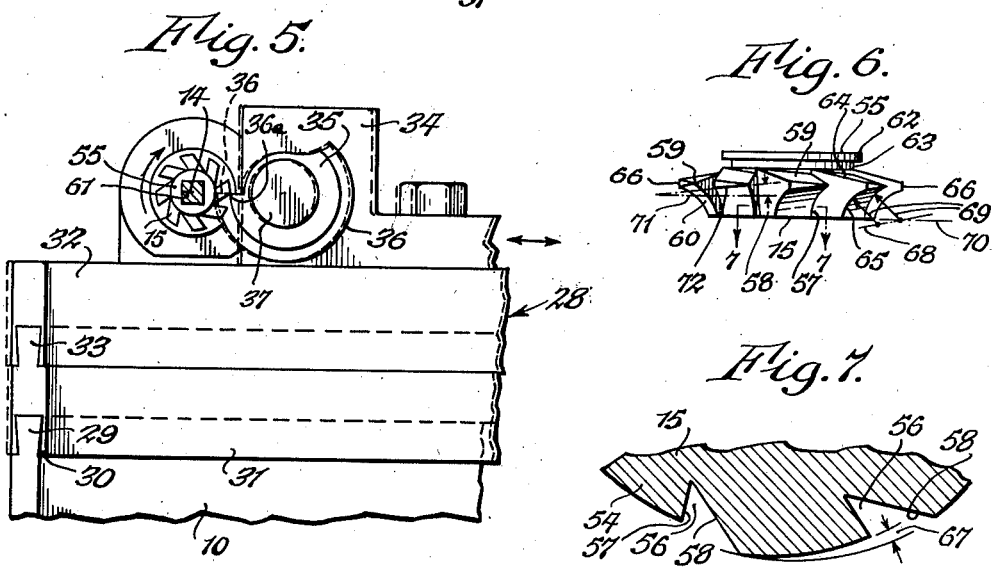
Fig. 5.
Fig. 6.
Fig. 7.
INVENTOR
Robert H. Butters
BY
John S. Powers
ATTORNEY Patented June 22, 1943

2,322,506

UNITED STATES PATENT OFFICE 2,322,506

MACHINE FOR AND METHOD OF RELIEVING MILLING CUTTERS

Robert H. Butters, Atlanta, Ga.

Application August 22, 1940, Serial No. 353,661

11 Claims. (Cl. 82—19)

This invention relates to a machine for and a method of relieving milling cutters such as are employed in forming or renewing gin or linter saw teeth in a machine of the type described in the patent of R. H. Butters No. 1,329,036 and according to the method disclosed in the patent of R. H. Butters No. 1,277,375.

In general milling cutters of the kind referred to vary as to size, number and shape of teeth and spacing. They are, however, of the characteristic design disclosed in the patent to R. H. Butters No. 1,346,396. That is to say, they include a hub and a suitable number of radiating teeth, each of which is formed with front, rear, upper and under faces which terminate in a peripheral tip and upper and lower cutting edges which are located in the plane of the front face and which converge from the hub outwardly to the tip, the lower cutting edge being curved concavely in accordance with the desired shape of the backs of the saw teeth and the under face being curved correspondingly so that the lower cutting edge may be sharpened as often as occasion may demand without effecting any substantial change in its contour.

Heretofore, in order to provide relief for the lower cutting edges of the teeth, it has been the practice to form the concave under face of each tooth so that it recedes radially from the front face to the rear face and this has been accomplished in a machine wherein the forming tool is advanced in a direction at right angles to the axis of rotation of the cutter, thereby forming the under face so that a line through the centers of radii from different circumferential points between the front and rear faces will be normal to the cutter axis. I have discovered that, although this method of procedure provides adequate relief for the lower portion of each lower cutting edge, this is not true with respect to the upper portion which has a greater axial inclination, the relief thus provided decreasing from a maximum along the lower portion of the cutting edge to a minimum along the outwardly curved upper portion with the attendant result that the latter, despite the fact that it is to be subjected to the greatest strain, is relieved the least. As a consequence of the inadequacy of such relief prior cutters have been noisy in operation; they have had a tendency to form burs on one side of the saw teeth; and their teeth have been subject to frequent breakage owing to excessive wearing in the region of the upper cutting edges.

One object of the present invention is to overcome the above objections, this object contemplating a machine which will shape milling cutters of the type generally described in such a manner that adequate relief will be provided for all portions of the lower cutting edges of the teeth.

A further object is a novel method of obtaining such relief.

The invention is illustrated in the accompanying drawings in which:

Figure 1 is a plan view of the machine in which the features of the invention are incorporated.

Figure 2 is a front elevation of the machine.

Figure 3 is a section taken along line 3—3 of Figure 1.

Figure 4 is a fragmentary section taken along line 4—4 of the same figure.

Figure 5 is a section taken along line 5—5 of Figure 1.

Figure 6 is a side view of a cutter having the lower cutting edges relieved in accordance with the invention.

Figure 7 is an enlarged fragmentary view of the cutter and is taken along line 7—7 of Figure 6.

The machine, as illustrated, includes a base 10, one end of which carries a headstock 11 and the other end of which carries a tailstock 12. The spindle 13 of the former accommodates a live center 14, the squared end of which is adapted to carry the milling cutter 15 which is to be relieved in accordance with the invention. A worm wheel 16 (Figure 3) which is fixed to the spindle 13 meshes with a worm 17 formed or provided upon a shaft 18, the latter carrying a pulley 19 by which it may be connected to a driving motor.

The cutter 15 is held upon the squared end of the live center 14 by a center 20, the latter being mounted for axial movement in the sleeve-like body 21 of the tail-stock and being formed at its inner tapered end with a socket 22 which the squared end of the live center may enter and in which it may rotate. A spring 23 which is arranged upon the reduced outer end of the center 20 between the pedestal of the tailstock and an upright bar 24 normally biases the said center so that the inner end presses the cutter 15 firmly upon the live center 14. In order to provide for the quick release of the cutter so that it may be removed from the end of the live center the outer end of the center 20 is formed with an annular channel 25. The latter accommodates the forked end of a lever 26 which is pivotally mounted upon a post 26a and which is operable to move the center 20 away from the cooperating center 14 against the action of the spring 23.

A lateral extension 27 of the base 10 supports that the angle of the line 68 with respect to the plane 70 will be of the order of 7½°, more or less. In other words, the curvature of the under face in any plane parallel to that of the front face is substantially the same but such curvature begins at progressively higher points and is located progressively further inwardly in the direction of the axis of the cutter as planes are selected further and further in a circumferential direction from the front face. As a result in addition to the substantial relief which is thus provided for the lower portion of the lower cutting edge, substantial relief is also provided for the upper portion despite the fact that the latter and the corresponding portion of the under face have a directional inclination with the major component in a plane normal to the axis of the cutter. Thus, referring to Figure 6, it will be noted that with respect to a horizontal plane 71 (a plane normal to the axis of the cutter) the edge 72 of the tip of the tooth is inclined upwardly at a substantial angle.

The relief for the upper cutting edges 64 may be provided in any suitable manner. It is preferred, however, that the relief for the leading edges 66 be provided by the tool 35 simultaneously with the cutting of the under faces 60 and to this end the said tool is formed with a transverse edge 36a which forms an outwardly extending continuation of the edge 36, it being understood in this connection that although radii and centers are referred to in describing the curvatures of the under faces of the teeth it is not intended that these terms be strictly construed as it will be appreciated that the advantages of the invention may be attained even though portions of the under faces are not accurately concentric with respect to other portions.

From the foregoing it will be apparent that the machine will shape the teeth of the cutter so that substantial relief is provided for all portions of the lower cutting edges and that such relief will remain substantially constant despite frequent sharpening of the teeth. The cutter, therefore, will run freely and quietly without the formation of burs on the saw teeth. A further advantage obtained is that the tips of the teeth are so formed that they are adequately reinforced against the strains to which they will be subjected without impairing or reducing the effectiveness of the cutter.

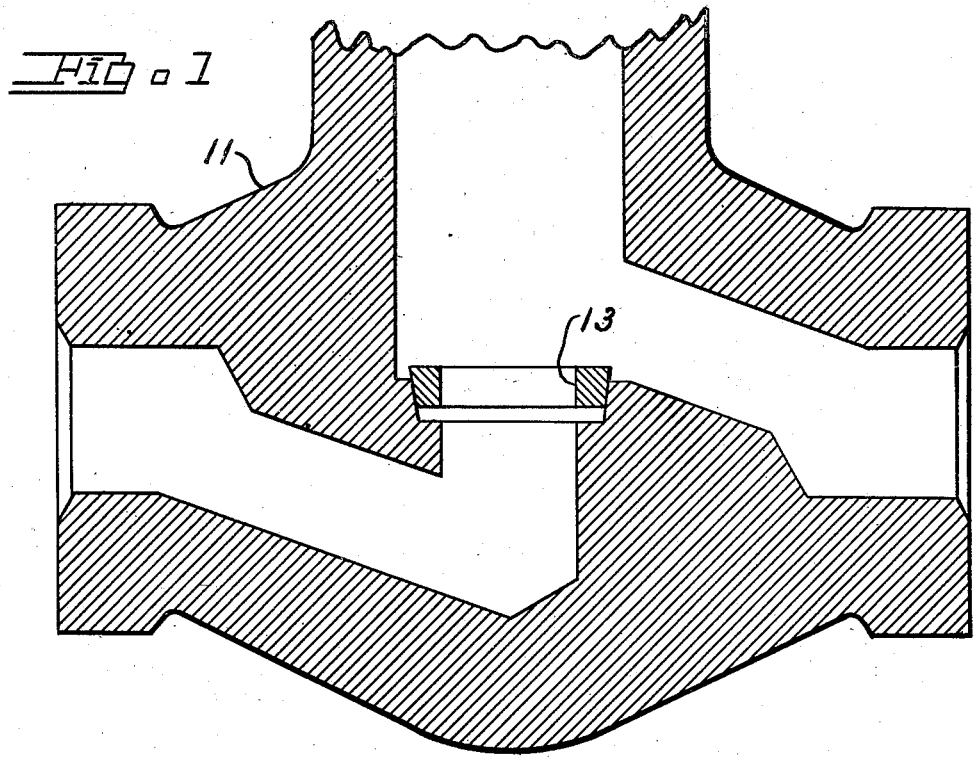
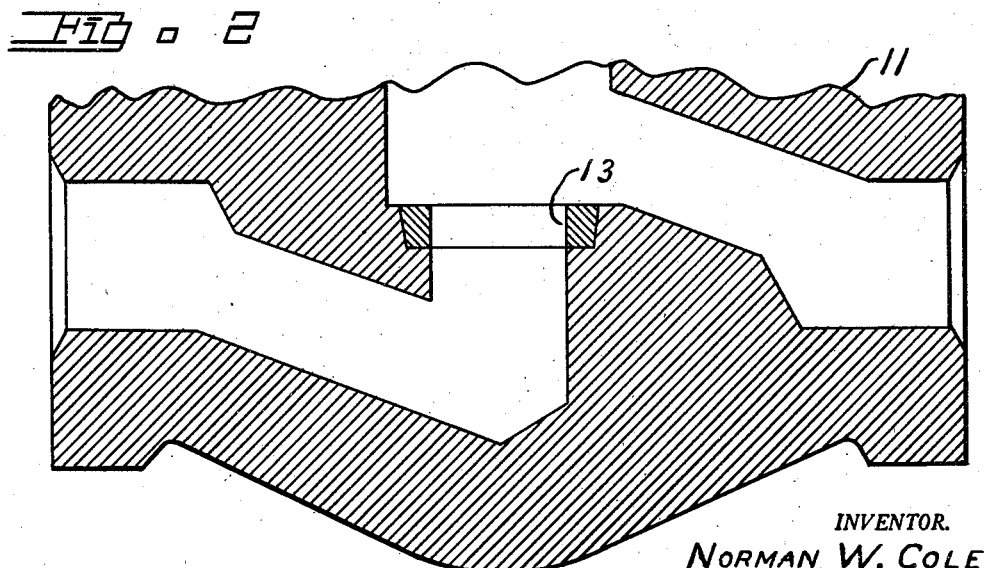

I claim as my invention:

1. The method of forming relief for the lower cutting edges of a rotary milling cutter having a hub and radiating teeth, each of which has front, rear, upper and under faces which terminate in a peripheral tip and upper and lower cutting edges located in the plane of the front face and converging from the hub outwardly to the tip, which method comprises cutting the under side of each tooth along a concave path extending spirally about the axis of the cutter in the direction of the upper face, whereby to provide a predetermined measure of relief for the upper portions of the lower cutting edges as well as adequate relief for the lower portions.

2. The method of forming relief for the lower cutting edges of a rotary milling cutter having a hub and radiating teeth, each of which has front, rear, upper and under faces which terminate in a peripheral tip and upper and lower cutting edges located in the plane of the front face and converging from the hub outwardly to the tip, which method comprises cutting the under side of each tooth along a concave path extending circumferentially in the direction of the upper face in a spiral of diminishing radius, whereby to provide a predetermined measure of relief for the upper portions of the lower cutting edges as well as adequate relief for the lower portions.

3. The method of forming relief for the lower cutting edges of a rotary milling cutter having a hub and radiating teeth, each of which has front, rear, upper and under faces which terminate in a peripheral tip and upper and lower cutting edges located in the plane of the front face and converging from the hub outwardly to the tip, which method comprises rotating the cutter about the axis of said hub and cutting the under side of each tooth along a concave path extending spirally about said axis in the direction of the upper face, whereby to provide a predetermined measure of relief for the upper portions of the lower cutting edges as well as adequate relief for the lower portions.

4. The method of forming relief for the lower cutting edges of a rotary milling cutter having a hub and radiating teeth, each of which has front, rear, upper and under faces which terminate in a peripheral tip and upper and lower cutting edges located in the plane of the front face and converging from the hub outwardly to the tip, which method comprises rotating the cutter about the axis of said hub and cutting the under side of each tooth along a concave path extending circumferentially in the direction of the upper face in a spiral of diminishing radius, whereby to provide a predetermined measure of relief for the upper portions of the lower cutting edges as well as adequate relief for the lower portions.

5. A machine for relieving rotary milling cutters of the kind having a hub and radiating teeth, said machine including a base formed with a lateral extension, a spindle for rotatably supporting a cutter, a shaft at one end of said base for driving said spindle, a cam fixed to said shaft, a relief forming tool, a carriage for said tool, a track for said carriage on said lateral extension, a second shaft at the outer end of said lateral extension, a second cam carried by said second shaft and engageable with said carriage, an arm having one end fixed to said second shaft and the other end extending into cooperating relation with said cam, whereby the latter is operative as said spindle is rotated to rock said second shaft to cause said second cam to advance said carriage toward said cutter.

6. A machine for relieving rotary milling cutters of the kind having a hub and radiating teeth, said machine including a base formed with a lateral extension, a spindle mounted at one end of said base for supporting a cutter, a shaft for driving said spindle, a cam fixed to said shaft, a relief forming tool, a carriage for said tool, a track for said carriage on said lateral extension, a second shaft at the outer end of said lateral extension, an arm having one end fixed to said second shaft and the other end extending angularly into cooperating relation with said cam, means connecting said second shaft and carriage, whereby as said spindle is rotated said cam is operative to rock said second shaft to advance said carriage toward said cutter, and resilient means for retracting said carriage after each such advancing movement.

7. A machine for relieving rotary milling cutters of the kind having a hub and radiating teeth, said machine including a spindle for rotatably supporting a cutter, a shaft, means for driving said spindle and shaft in timed relation, a cam fixed to said shaft, a relief forming tool, a carriage comprising a lower section and an upper section which is supported upon the lower section and which carries said tool, a track for the lower section of said carriage, a second shaft, an arm having one end fixed to said second shaft and the other end extending into cooperating relation with said cam, means connecting said second shaft and the lower carriage section, whereby as said spindle is rotated said cam is operative to rock said second shaft to advance said carriage toward said cutter, resilient means for retracting said carriage after each such advancing movement, and means for adjusting the upper section of said carriage upon the lower section to vary the starting position of said tool.

8. A machine for relieving rotary milling cutters of the kind having a hub and radiating teeth, said machine including a base formed with a lateral extension, a spindle for rotatably supporting a cutter, a shaft for driving said spindle, a cam fixed to said shaft, a relief forming tool, a carriage comprising a lower section and an upper section which is supported upon the lower section and which carries said tool, a track on said lateral extension for the lower section of said carriage, a second shaft at the outer end of said lateral extension, an arm having one end fixed to said second shaft and the other end extending angularly into cooperating relation with said cam, means connecting said second shaft and the lower carriage section, whereby as said spindle is rotated said cam is operative to rock said second shaft to advance said carriage toward said cutter, resilient means for retracting said carriage after each such advancing movement, and means for adjusting the upper section of said carriage upon the lower section to vary the starting position of said tool.

9. A machine for relieving rotary milling cutters of the kind having a hub and radiating teeth, said machine including a spindle for supporting a cutter, means for rotating said spindle including driving and driven gears, the ratio of said gears being predetermined by the number of teeth on said cutter, a drive shaft for said driving gear, a cam fixed to said shaft, a relief forming tool, a carriage comprising a lower section and an upper section which is supported upon the lower section and which carries said tool, a track for the lower section of said carriage, a second shaft, an arm having one end fixed to said second shaft and the other end extending angularly into cooperating relation with said cam, means for connecting said second shaft and the lower carriage section, whereby as said spindle is rotated said cam is operative to rock said second shaft to advance said carriage toward said cutter, resilient means for retracting said carriage after each such advancing movement, and means for adjusting the upper section of said carriage upon the lower section to vary the starting position of said tool.

10. A machine for relieving a rotary milling cutter of the kind having a hub which is formed with a multi-sided bore and which carries radiating teeth, said machine including a spindle having a multi-sided extension which is accommodated in said bore, a spring-biased element for holding said cutter on said extension, said element having a socket in one end for accommodating the terminal portion of said extension, means for driving said spindle, a relief forming tool, a carriage for said tool, and means for actuating said carriage to advance and retract said tool as said cutter is rotated to form the corresponding face of each of said teeth with a predetermined curvature.

11. A machine for relieving a rotary milling cutter of the kind having a hub which is formed with a multi-sided bore and which carries radiating teeth, said machine including a spindle having a multi-sided extension which is accommodated in said bore, a spring-biased element for holding said cutter on said extension, said element having a socket in one end for accommodating the terminal portion of said extension, a shaft for driving said spindle, a cam fixed to said shaft, a relief forming tool, a carriage for said tool, and means including said cam for actuating said carriage to advance and retract said tool as said cutter is rotated to form the corresponding face of each of said teeth with a predetermined curvature.

ROBERT H. BUTTERS.